(12) United States Patent
Aiyar et al.

(10) Patent No.: US 10,599,512 B2
(45) Date of Patent: Mar. 24, 2020

(54) SYSTEM AND METHOD FOR CREATING AND USING HYBRID VIRTUAL COMPUTING SYSTEMS INCLUDING A RESERVED PORTION OF A CAPACITY BASED ON CLUSTER FAILURE PROBABILITY

(71) Applicant: Nutanix, Inc., San Jose, CA (US)

(72) Inventors: Srinivas Aiyar, Sammamish, WA (US); Ravi Sundaram, Boston, MA (US)

(73) Assignee: NUTANIX, INC., San Jose, CA (US)

( * ) Notice: Subject to any disclaimer, the term of this patent is extended or adjusted under 35 U.S.C. 154(b) by 95 days.

(21) Appl. No.: 16/045,654

(22) Filed: Jul. 25, 2018

(65) Prior Publication Data

US 2019/0384668 A1    Dec. 19, 2019

Related U.S. Application Data

(63) Continuation of application No. 16/006,906, filed on Jun. 13, 2018.

(51) Int. Cl.
*G06F 11/20* (2006.01)
*G06F 11/07* (2006.01)
(Continued)

(52) U.S. Cl.
CPC ...... *G06F 11/0793* (2013.01); *G06F 9/45558* (2013.01); *G06F 9/5077* (2013.01);
(Continued)

(58) Field of Classification Search
CPC ....... G06F 2009/45562; G06F 11/0712; G06F 9/5077; G06F 9/45558
See application file for complete search history.

(56) References Cited

U.S. PATENT DOCUMENTS 7,308,532 B1    12/2007  Wood et al.
8,489,844 B2     7/2013  Orikasa et al.
(Continued)

OTHER PUBLICATIONS

Chen, et al., "Peeking Beneath the Hood of Uber," In Proceedings of the 2015 ACM Conference on Internet Measurement Conference, Oct. 28-30, 2015, pp. 495-508, ACM, New York, NY, USA.
(Continued)

*Primary Examiner* — Joseph O Schell
(74) *Attorney, Agent, or Firm* — Foley & Lardner LLP

(57) ABSTRACT

Systems and methods for creating and using a hybrid system include determining, by a capacity allocation system associated with a virtual computing system, capacity of a reserve portion and capacity of an allocation portion of a first site based upon a probability of failure associated with a plurality of second sites. The systems and methods also include allocating, by the capacity allocation system, the capacity of the allocation portion among the plurality of second sites for operating a portion of the plurality of second sites from the first site, determining, by the capacity allocation system, that a number of failures at the plurality of second sites exceeds a first pre-determined threshold, and dynamically adjusting, by the capacity allocation system, the capacity of the reserve portion and the capacity of the allocation portion of the first site based upon the number of the failures.

20 Claims, 6 Drawing Sheets

(51) Int. Cl.
G06F 9/455 (2018.01)
G06F 9/50 (2006.01)
(52) U.S. Cl.
CPC ........ *G06F 11/076* (2013.01); *G06F 11/0712* (2013.01); *G06F 11/2069* (2013.01); *G06F 11/2074* (2013.01); *G06F 11/2092* (2013.01); *G06F 11/2094* (2013.01); *G06F 2009/45562* (2013.01); *G06F 2009/45595* (2013.01)

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,990,397 B2* | 3/2015 | Yeow | G06F 11/2041 709/226 |
| 9,055,067 B1* | 6/2015 | Ward, Jr. | H04L 67/10 |
| 9,183,085 B1 | 11/2015 | Northcott | |
| 9,369,360 B1 | 6/2016 | Segalov et al. | |
| 9,588,162 B2 | 3/2017 | Zibold et al. | |
| 9,772,866 B1 | 9/2017 | Aron et al. | |
| 10,120,764 B1* | 11/2018 | Ramachandran | G06F 11/1464 |
| 2003/0061546 A1 | 3/2003 | Collins et al. | |
| 2005/0033936 A1* | 2/2005 | Nakano | G06F 3/0605 711/170 |
| 2005/0060618 A1 | 3/2005 | Guha | |
| 2006/0036901 A1 | 2/2006 | Yang et al. | |
| 2006/0041782 A1 | 2/2006 | Ali et al. | |
| 2008/0021902 A1 | 1/2008 | Dawkins et al. | |
| 2009/0198791 A1* | 8/2009 | Menghnani | G06F 3/0605 709/215 |
| 2014/0317446 A1* | 10/2014 | Best | G06F 11/2082 714/6.23 |
| 2015/0012775 A1* | 1/2015 | Cudak | G06F 3/0619 714/6.22 |
| 2015/0074469 A1 | 3/2015 | Cher et al. | |
| 2019/0042126 A1* | 2/2019 | Sen | G06F 9/4406 |
| 2019/0181887 A1 | 6/2019 | Banerjee et al. | |

OTHER PUBLICATIONS

Kokkinos, et al., "Survey: Live Migration and Disaster Recovery over Long-Distance Networks," ACM Computing Surveys, Nov. 2016, 36 pages, vol. 49, Issue 2, Article No. 26.

Pietri, et al., "Mapping Virtual Machines onto Physical Machines in Cloud Computing: A Survey," ACM Computing Surveys, Dec. 2016, 30 pages, vol. 49, Issue 3, Article No. 49.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Singh, Jaspreet, "Understanding RPO and RTO," Druva Blog, Mar. 22, 2008, 6 pages, http://www.druva.com/blog/understanding-rpo-and-rto/.

Wikipedia—Financial crisis of 2007-2008, printed from the internet Jun. 18, 2018.

Wikipedia, California electricity crisis, printed from the internet Jun. 18, 2018, 10 pages.

Wikipedia, Chernoff Bound printed Jun. 18, 2018.

Wikipedia, Law of Large numbers, printed from the internet Jun. 18, 2018, 25 pages.

Cano, Ignacio, et al. "Curator: Self-Managing Storage for Enterprise Clusters" (Mar. 27, 2017), from https://www.usenix.org/conference/nsdi17/.

Dubhashi, Devdatt P. et al., pp. 17-33 from Oct. 21, 2005 Draft of "Concentration of Measure for the Analysis of Randomised Algorithms" (1st ed.), 2009, Cambridge University Press, New York, NY, USA.

S. Gopisetty et al. "Automated planners for storage provisioning and disaster recovery" IBM J. Res. & Dev., vol. 52, No. 4/5 Jul./Sep. 2008, pp. 353-365.

* cited by examiner

SYSTEM AND METHOD FOR CREATING AND USING HYBRID VIRTUAL COMPUTING SYSTEMS INCLUDING A RESERVED PORTION OF A CAPACITY BASED ON CLUSTER FAILURE PROBABILITY

CROSS-REFERENCE TO RELATED APPLICATIONS

This application is a continuation of U.S. application Ser. No. 16/006,906, filed on Jun. 13, 2018, the entirety of which is incorporated by reference herein.

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with at least some aspects of the present disclosure, a method is disclosed. The method includes determining, by a capacity allocation system associated with a virtual computing system, capacity of a reserve portion and capacity of an allocation portion of a first site based upon a probability of failure associated with a plurality of second sites. The method also includes allocating, by the capacity allocation system, the capacity of the allocation portion among the plurality of second sites for operating a portion of the plurality of second sites from the first site, determining, by the capacity allocation system, that a number of failures at the plurality of second sites exceeds a first pre-determined threshold, and dynamically adjusting, by the capacity allocation system, the capacity of the reserve portion and the capacity of the allocation portion of the first site based upon the number of the failures.

In accordance with some aspects of the present disclosure, a system is disclosed. The system includes a capacity allocation system associated with a virtual computing system, the capacity allocation system including a database configured to store allocation information related to an allocation portion of a first site and a processing unit. The processing unit is configured to determine capacity of a reserve portion and capacity of the allocation portion of the first site based upon a probability of failure associated with a plurality of second sites, allocate the capacity of the allocation portion among the plurality of second sites for operating a portion of the plurality of second sites from the first site, including storing the allocation information in the database, and determine that a number of failures at the plurality of second sites exceeds a first pre-determined threshold. The processing unit is also configured to dynamically adjust the capacity of the reserve portion and the capacity of the allocation portion of the first site based upon the number of the failures.

In accordance with some aspects of the present disclosure, a non-transitory computer readable media including computer-executable instructions is disclosed. The instructions when executed by a processor of a capacity allocation system associated with a virtual computing system, cause the capacity allocation system to perform a process including determining capacity of a reserve portion and capacity of an allocation portion of a first site based upon a probability of failure associated with a plurality of second sites, allocating the capacity of the allocation portion among the plurality of second sites for operating a portion of the plurality of second sites from the first site, and determining that a number of failures at the plurality of second sites exceeds a first pre-determined threshold. The process also includes dynamically adjusting the capacity of the reserve portion and the capacity of the allocation portion of the first site based upon the number of the failures.

The foregoing summary is illustrative only and is not intended to be in any way limiting. In addition to the illustrative aspects, implementations, and features described above, further aspects, implementations, and features will become apparent by reference to the following drawings and the detailed description.

Figure 1:
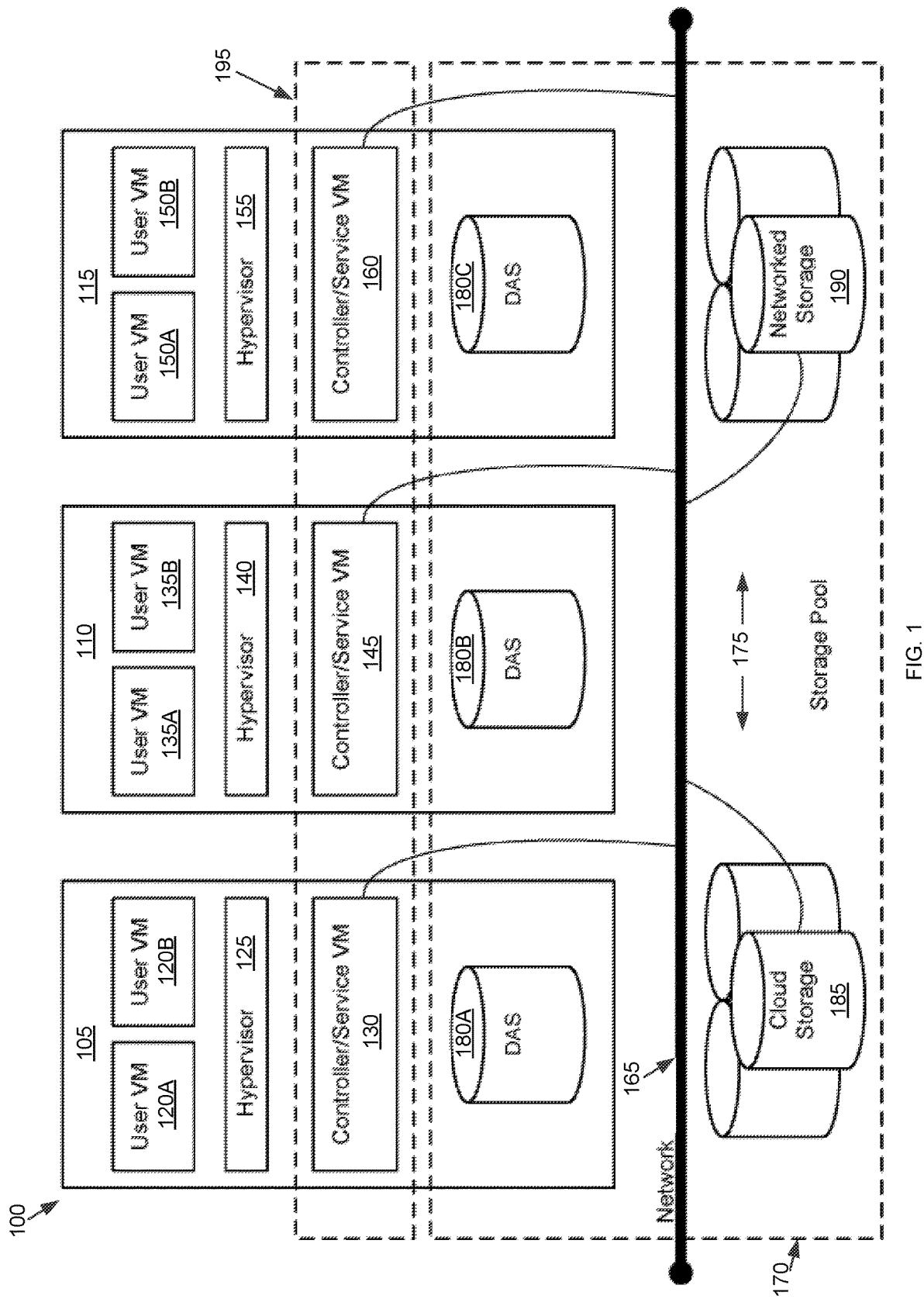
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a virtual computing system including a plurality of clusters, with each of the plurality of clusters including one or more host machines (also referred to herein as "nodes"). Each of the one or more host machines include one or more virtual machines running thereon, with each of the one or more virtual machines running one or more applications. Further, in some embodiments, the virtual computing system may be organized into client sites and a disaster recovery site. Each of the client sites and the disaster recovery site include the plurality of clusters, host machines, and virtual machines, as discussed above.

In some embodiments, the disaster recovery site is managed by a site operator. The client sites may enter into a Service Level Agreement ("SLA") with the site operator for using the disaster recovery site. The disaster recovery site is a highly engineered and reliable virtual computing system that provides data recovery and data backup facilities to the client sites in accordance with the SLA, and maintains a continuity of operation of the client sites in the aftermath of a disaster condition. A disaster condition may include planned outages, performance related failures, component failures, power failures, natural calamities, or any other condition that hampers the normal operation of the clusters at the client sites. Generally speaking and as used herein, a disaster condition is any condition that causes hardware failure or otherwise prevents a hardware component from operating as intended. For example, a condition that causes a malfunction of any cluster at a client site or that significantly hampers the normal operation of any clusters is referred to as a disaster condition.

When a disaster condition is detected, impacted clusters from the client sites are migrated to the disaster recovery sites for operation until the disaster condition is resolved. Migration of the clusters from the client sites to the disaster recovery site greatly reduces the downtime of the client sites due to the disaster condition and maintains a substantial continuity of operation of the client sites. Upon the resolution of the disaster condition, the clusters are migrated back to the client sites and resume operation from the client sites.

Conventionally, the disaster recovery site is used only for managing the disaster conditions. When no disaster conditions are detected, the disaster recovery site sits idly in a cold-standby state, waiting for a disaster condition to strike. Nonetheless, since the client sites rely on the disaster recovery site for continuity of operation, the disaster recovery site needs to be constantly maintained and in an operable condition at all times. Given the highly engineered and highly reliable state of the disaster recovery site, maintenance of the disaster recovery site is expensive. Further, since the disaster recovery site is only used intermittently, the resources of the disaster recovery site are underutilized. Thus, operation and running of the disaster recovery site is not only expensive, it is inefficient.

The present disclosure provides solutions. For example, the present disclosure provides a mechanism using which a first portion of the disaster recovery site is reserved for disaster recovery purposes such that the disaster recovery site is always available for receiving clusters from the client sites when disaster conditions are detected. This first portion is referred to herein as a reserve portion. In addition, the present disclosure provides a second portion, referred to herein as an allocation portion, in the disaster recovery site that is allocated to the client sites for running a portion of their clusters under normal operating conditions (e.g., non-disaster conditions) from the disaster recovery site. Thus, the client sites include a first fraction of clusters that are migrated to the disaster recovery site pre-disaster and operate from the disaster recovery site instead of from the client sites. In the aftermath of a disaster, the first fraction is already on the disaster recovery site, and therefore, does not need to be migrated to the disaster recovery site. The client sites also include a second fraction that is operated from the client sites and migrated to the disaster recovery site only when a disaster condition strikes (e.g., post-disaster).

Thus, the present disclosure provides a mechanism for creating a hybrid system in which the disaster recovery site is available for disaster recovery purposes, but uses the resources of the disaster recovery site in a more efficient way by using the disaster recovery site for non-disaster recovery purposes as well. Further, by proactively migrating a portion of the clusters from the client site to the disaster recovery site pre-disaster, the client sites achieve great benefits. For example, time to resume normal operations after a disaster condition is faster. Similarly, since the disaster recovery site is highly reliable, only data that is on the client sites needs to be regularly backed up. So, the amount of data that needs to be backed-up is reduced. Further, the time needed to migrate the impacted clusters from the client sites to the disaster recovery site under a disaster condition is reduced. Therefore, by creating and using the hybrid system, operation of both, the client sites and the disaster recovery site is greatly improved and the resources better utilized.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Further, although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100. For example, in some embodiments, the local management system may perform various management related tasks on the user VMs 120, the user VMs 135, and the user VMs 150. Additionally, in some embodiments, although not shown, the virtual computing system 100 includes a central management system (e.g., Prism Central from Nutanix, Inc.) that is configured to manage and control the operation of various clusters in the virtual computing system. In some embodiments, the central management system may be configured to communicate with the local management systems on each of the controller/service VM 130, the controller/service VM 145, the controller/service VM 160 for controlling the various clusters.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within the virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another. Additionally and as explained in greater detail below, the virtual computing system 100 may be part of a data center, a disaster recovery site, or other types of private and public clusters. For example, as part of a private cluster and/or a datacenter, in some embodiments, the virtual computing system 100 may be hosted on a premise of an enterprise customer.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
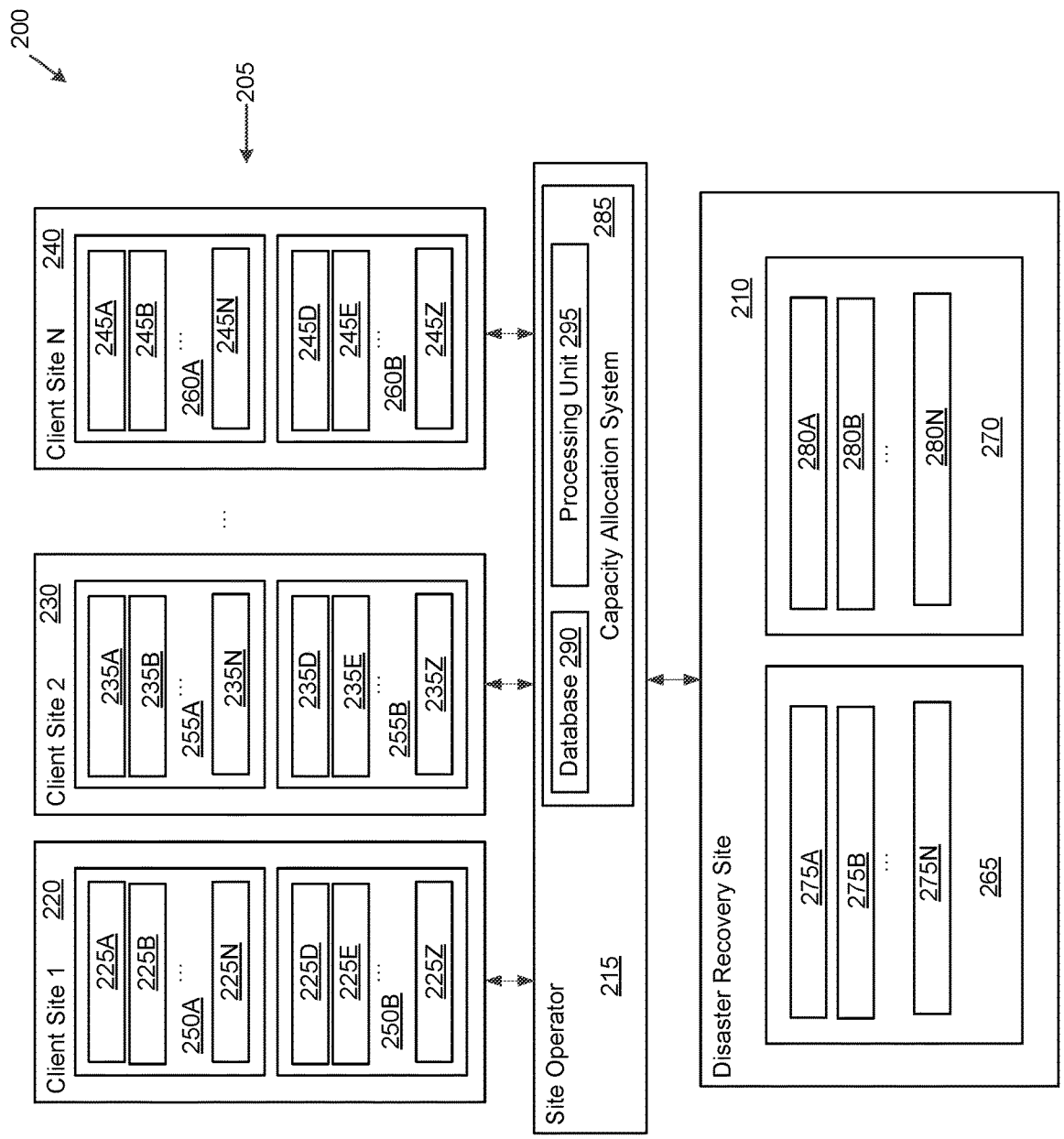
FIG. 2 is a block diagram of a hybrid system, in accordance with some embodiments of the present disclosure.

Turning now to FIG. 2, an example block diagram of a hybrid system 200 is shown, in accordance with some embodiments of the present disclosure. The hybrid system 200 is a virtual computing system that is organized into a plurality of client sites 205 that share resources of a disaster recovery site 210. A site operator 215 manages the disaster recovery site 210, as well as the interaction between the plurality of client sites 205 and the disaster recovery site. In some embodiments, each of the plurality of client sites 205 may be enterprise customers, organizations, or other entities associated with or otherwise hosting one or more clusters of a virtual computing system (e.g., the virtual computing system 100). For example, a client site 220 of the plurality of client sites 205 may be associated with clusters 225A-225N and 225D-225Z, a client site 230 may be associated with clusters 235A-235N and 235D-235Z, and a client site 240 may be associated with clusters 245A-245N and 245D-245Z. Each of the clusters 225A-225N, 225D-225Z, 235A-235N, 235D-235Z, 245A-245N, and 245D-245Z may be similar to the cluster shown in the virtual computing system 100 of FIG. 1. Thus, although not shown, each of the clusters 225A-225N, 225D-225Z, 235A-235N, 235D-235Z, 245A-245N, and 245D-245Z may include one or more user VMs, hypervisors, controller/service VMS, storage pool, and other elements described above with respect to FIG. 1. Further, each of the clusters 225A-225N, 225D-225Z, 235A-235N, 235D-235Z, 245A-245N, and 245D-245Z may be configured for access by their respective client sites 220, 230, and 240.

It is to be understood that although each of the plurality of client sites 205 have been shown as having a certain number of clusters (e.g., the clusters 225A-225N, 225D-225Z, 235A-235N, 235D-235Z, 245A-245N, and 245D-245Z), each of those client sites may have any number of clusters. Further, the number of clusters in each of the client sites 205 may vary from the number of clusters in the other client sites. Similarly, the configuration (e.g., number of virtual machines, the types of associated storage, and other hardware, software, and firmware features) of each of the clusters (e.g., the clusters 225A-225N, 225D-225Z, 235A-235N, 235D-235Z, 245A-245N, and 245D-245Z) of each of the plurality of client sites 205 may vary from one embodiment to another.

Furthermore, the clusters (e.g., the clusters 225A-225N, 225D-225Z, 235A-235N, 235D-235Z, 245A-245N, and 245D-245Z) of each of the plurality of client sites 205 may be divided into a first portion and a second portion. For example, the client site 220 includes a first portion 250A that includes the clusters 225A-225N and a second portion 250B that includes the clusters 225D-335Z. Similarly, the client site 230 includes a first portion 255A that includes the clusters 235A-235N and a second portion 255B that includes the clusters 235D-235Z, and the client site 240 includes a first portion 260A that includes the clusters 245A-245N and a second portion 260B that includes the clusters 245D-245Z.

The first portion 250A represents a subset of clusters (e.g., the clusters 225A-225N) that the client associated with the client site 220 desires to migrate and operate from the disaster recovery site 210 instead of from the client site pre-disaster (e.g., during non-disaster conditions), while the second portion 250B represents the subset of clusters (e.g., the clusters 225D-225Z) that the client desires to operate from the client site itself pre-disaster and migrate to the disaster recovery site 210 only during or after disaster conditions are identified. Similarly, the first portion 255A of the client site 230 and the first portion 260A of the client site 240 represents the portion of clusters (e.g., the clusters 235A-235N, 245A-245N) that the clients associated with those respective client site desires to migrate to the disaster recovery site 210 pre-disaster and the second portion 255B and the second portion 260B represents those clusters (e.g., the clusters 235D-235Z, 245D-245Z) that are normally operated from those respective client sites and migrated to the disaster recovery site during or post-disaster.

It is to be understood that although at least three clusters are shown in each of the first portion (e.g., the first portion 250A, 255A, and 260A) and the second portion (e.g., the second portion 250B, 255B, and 260B) of each of the plurality of client sites 205, the number of clusters in each of the first portion and the second portion in each of the client sites may vary and may be different from one another. Additionally, although all of the plurality of client sites 205 have been shown as having the first portion (e.g., the first portion 250A, 255A, and 260A) and the second portion (e.g., the second portion 250B, 255B, and 260B), it is to be understood that in some embodiments, some client sites may have only the second portion (e.g., operate all of the clusters from the client site pre-disaster) or only the first portion (e.g., operate all of the clusters from the disaster recovery site 210 pre-disaster). Thus, the configuration of each of the plurality of client sites 205 and the number of clusters that a particular client site desires to migrate pre-disaster to the disaster recovery site 210 may vary from one embodiment to another.

The disaster recovery site 210 provides a platform for data backup and recovery for the plurality of client sites 205. Specifically, the disaster recovery site 210 provides resources to migrate the clusters and associated data from one or more of the plurality of client sites 205 to the disaster recovery site during actual or impending failure of operation of those client sites. Thus, the disaster recovery site 210 provides a mechanism to maintain a continuity of operation and protection of resources of the plurality of client sites 205 during actual or impending failure of operation of those client sites, and thus, keep the client sites running without significant interruption until normal operations are resumed. Further, even though each of the client sites 220, 230, and 240 are separate and configured for independent operation, each of those client sites may share the disaster recovery site 210. Thus, the disaster recovery site 210 is configured to store information from a plurality of client sites (e.g., the plurality of client sites 205). The disaster recovery site 210 may be located in a location remote from the plurality of client sites 205.

Thus, the disaster recovery site 210 is a highly engineered, highly reliable platform that provides reliability of operation to the plurality of client sites 205. The disaster recovery site 210 includes a reserve portion 265 and an allocation portion 270. The reserve portion 365 is reserved for disaster recovery purposes for receiving clusters from the plurality of client sites 205 in the aftermath of a disaster condition. For example, the reserve portion 365 is reserved for the clusters 225D-225Z of the client site 220, the clusters 235D-235Z of the client site 230, and the clusters 245D-245Z of the client site 240 that are operated from those client sites and migrated to the disaster recovery site 210 only under disaster conditions. On the other hand, the allocation portion 270 of the disaster recovery site 210 is that portion of the disaster recovery site that receives clusters from the plurality of client sites 205 pre-disaster. For example, the allocation portion 270 is reserved for the clusters 225A-225N of the client site 220, the clusters 235A-235N of the client site 230, and the clusters 245A-245N of the client site 240 that are migrated to the disaster recovery site 210 before a disaster and operate from the disaster recovery site.

As will be discussed in greater detail below, the reserve portion 265 and the allocation portion 270 are dynamically changing portions such that a capacity of each of those portions may vary dynamically based on the disaster conditions impacting the plurality of client sites 205. Capacity of the reserve portion 265 and the allocation portion 270 may be defined in terms of the number of clusters within each of those portions. Specifically and similar to the plurality of client sites 205, the disaster recovery site 210 also includes a plurality of clusters having components similar to the virtual computing system 100, albeit more engineered and more reliable. Each of the reserve portion 265 and the allocation portion 270 may, therefore, also include a plurality of clusters. For example, as shown in FIG. 2, the reserve portion 265 may include a plurality of clusters 275A-275N, while the allocation portion 270 may include a plurality of clusters 280A-280N.

It is to be understood that although at least three clusters (e.g., the plurality of clusters 275A-275N and 280A-280N) are shown in each of the reserve portion 265 and the allocation portion 270, respectively, the number of clusters within each of those portions may vary, and each of those portions may have a different number of clusters. Further, each of the clusters (e.g., the plurality of clusters 275A-275N and 280A-280N) within the reserve portion 265 and the allocation portion 270 may be configured differently from other clusters. Also, the disaster recovery site 210 is shown as having only the clusters (e.g., the plurality of clusters 275A-275N and 280A-280N) simply for ease of instruction. Generally speaking, the disaster recovery site 210 is intended to include other components that are desired or needed to perform the functions described herein or to properly operate the disaster recovery site for its intended purpose.

The disaster recovery site 210 is managed by the site operator 215. The site operator 215 is a service provider that serves as an intermediary between the plurality of client sites 205 and the disaster recovery site 210. The site operator 215 may or may not own the disaster recovery site 210. The site operator 215 may determine that a disaster condition at one or more of the plurality of client sites 205 is occurring or is about to occur. In response to the determination of the disaster condition, the site operator 215 may migrate the clusters (e.g., the clusters 225D-225Z, 235D-235Z, and 245D-245Z) from the client sites 220, 230, and 240, respectively, to the disaster recovery site 210, and particularly, to the reserve portion 265 of the disaster recovery site.

To facilitate the determination of the disaster conditions and migrate the clusters (e.g., the clusters 225D-225Z, 235D-235Z, and 245D-245Z) to the disaster recovery site 210, the site operator 215 may enter into agreements, such as Service Level Agreements ("SLAs"), with the plurality of client sites 205. The SLAs define the level of service that the plurality of client sites 205 is to receive from the site operator in relation to the disaster recovery site 210. Thus, the SLAs may specify a variety of performance related requirements/parameters. For example, one such performance parameter is referred to as a Recovery Time Objective ("RTO"). RTO is measured forward in time from the moment a disaster condition occurs and is indicative of the time when a particular resource (e.g., user VM, clusters, etc.) is back up and running. In other words, RTO specifies the amount of downtime from the time a disaster condition strikes that a resource will be inoperative. Lower RTOs are desirable. RTO's may be measured in seconds, minutes, hours, or other units of time.

Another performance parameter in the SLA may be Recovery Point Objective ("RPO"). RPO is measured backward in time from the moment a disaster condition strikes. RPO is indicative of a resource's recovery time point. In other words, RPO determines how often data needs to be backed up that may otherwise be lost due to the disaster condition. RPO is also measured in units of time. Again, smaller RPOs are desired. For example, smaller the RPO, smaller is the amount of data lost, and therefore, data needs to be backed up less frequently.

Since the disaster recovery site 210 is highly reliable, and therefore, less prone to failures, by virtue of migrating a portion of the plurality of client sites 205 to the disaster recovery site proactively and operating that portion from the disaster recovery site, the chances of that portion failing due to a disaster condition are low. Thus, the site operator 215 may be able to offer a lower RPO and RTO to the plurality of client sites 205. The site operator 215 may even monetize the RPO and RTO savings and charge fees from the plurality of client sites 205 in exchange for increased reliability.

As indicated above, the disaster recovery site 210 includes the reserve portion 265 and the allocation portion 270. The site operator 215 may determine the capacity of the reserve portion 265 and the allocation portion 270. Thus, the site operator 215 includes a capacity allocation system 285 that dynamically determines the capacity of the reserve portion 265 and the allocation portion 270 of the disaster recovery site 210, as discussed below. Although the capacity allocation system 285 has been shown as being part of the site operator 215 in FIG. 2, the capacity allocation system may be part of the disaster recovery site 210 and/or the plurality of client sites 205. Further, the capacity allocation system 285 may be owned, operated, and otherwise managed by the any one or more of the plurality of client sites 205 or a third party.

Further, the capacity allocation system comprises a database 290 for storing a variety of information including allocation information of the allocation portion 270, as directed herein, as well as a processing unit 295 for computing the capacities of the reserve portion 265 and the allocation portion. Thus, the processing unit 295 may be configured to execute instructions. The instructions may be carried out by a special purpose computer, logic circuits, or hardware circuits. The processing unit 295 may be implemented in hardware, firmware, software, or any combination thereof. Again and as indicated above, the term "execution" is, for example, the process of running an application or the carrying out of the operation called for by an instruction. The instructions may be written using one or more programming language, scripting language, assembly language, etc. The processing unit 295, thus, executes an instruction, meaning that it performs the operations called for by that instruction.

The processing unit 295 may be operably coupled to the database 290 of the capacity allocation system 285 to receive, send, and process information, and to control the operations of computing the reserve portion 265 and the allocation portion 270. The processing unit 295 may retrieve a set of instructions from the database 290, such as, from a permanent memory device like a read only memory ("ROM") device and copy the instructions in an executable form to a temporary memory device that is generally some form of random access memory ("RAM"). The processing unit 295 may include a single stand-alone processing unit, or a plurality of processing units that use the same or different processing technology.

Although the capacity allocation system 285 has been shown as having only the database 290 and the processing unit 295, in other embodiments, the capacity allocation system may include other hardware, software, and firmware components that may be needed to perform the functions described herein. Likewise, although the site operator 215 has been shown as only having the capacity allocation system 285, in other embodiments, the site operator 215 may include a variety of hardware, software, and firmware components that are configured to facilitate communication between the plurality of client sites 205 and the disaster recovery site 210, facilitate the migration of clusters between the client sites and the disaster recovery site, as well as operate, manage, and monitor the disaster recovery site, and possibly the plurality of client sites.

Figure 3:
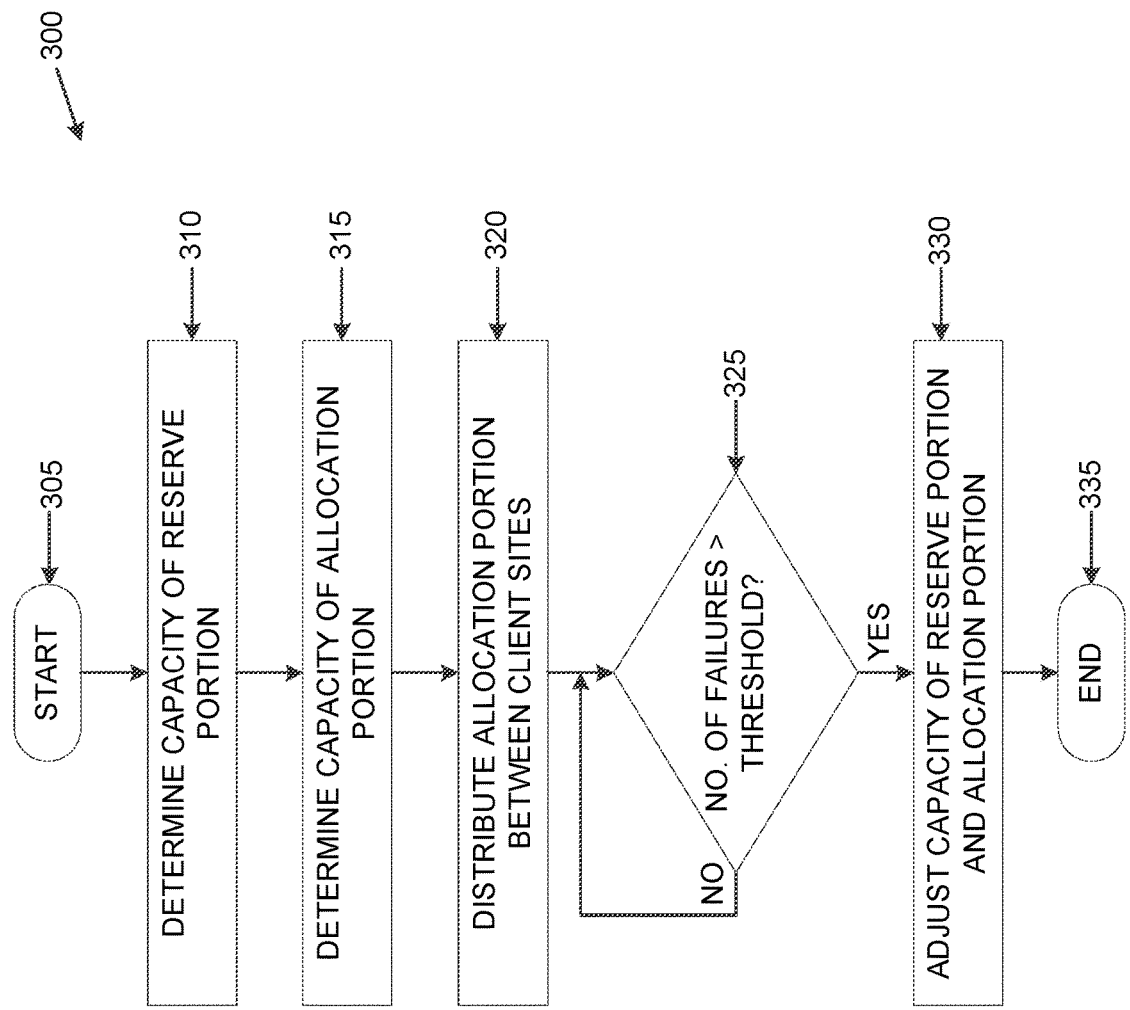
FIG. 3 is an example flowchart outlining operations for creating the hybrid system, in accordance with some embodiments of the present disclosure.

Turning now to FIG. 3, an example flowchart outlining a process 300 for creating a hybrid system (e.g., the hybrid system 200) is shown, in accordance with some embodiments of the present disclosure. The process 300 may include additional, fewer, or different operations, depending on the particular embodiment. The process 300 is discussed in conjunction with FIG. 2 and is implemented by the capacity allocation system 285 of the site operator 215. The process 300 outlines operation for creating the reserve portion 265 and the allocation portion 270 to create the hybrid system, as well as dynamically varying those portions based upon the disaster conditions. Thus, upon starting at operation 305, the capacity allocation system 285 determines a capacity of the reserve portion 265 that is to be saved for disaster recovery purposes at operation 310. The capacity of the reserve portion 265 is computed from a probability of a disaster condition striking at the plurality of client sites 205 that may lead to a failure of a cluster at those client sites (also referred to herein as a "probability of failure"). The process of determining the reserve portion 265 is discussed in greater detail in FIG. 4 below.

Upon identifying the capacity of the reserve portion 265, the capacity allocation system 285 determines the capacity of the allocation portion 270 at operation 315. The total capacity of the disaster recovery site 210 that would otherwise be available to the plurality of client sites 205 for disaster recovery is known to the capacity allocation system. From this total capacity, the capacity allocation system determines the capacity of the reserve portion 265 at the operation 310. Thus, the remaining portion of the total capacity is the capacity of the allocation portion 270. Therefore, by subtracting the capacity of the reserve portion 265 from the total capacity, the capacity allocation system determines the capacity of the allocation portion 270.

The capacity allocation system 285 distributes the capacity of the allocation portion 270 among the plurality of client sites 205 at operation 320. The capacity allocation system 285 allocates portions from the allocation portion 270 to one or more of the plurality of client sites 205 based on a fraction (e.g., number of clusters out of the total number of clusters on a particular client site) that those client sites wish to migrate to the disaster recovery site 210 pre-disaster. The capacity allocation system 285 may also consider additional information, such as the RTO and RPO metrics that the one or more of the plurality of client sites 205 desire to achieve after the migration. As discussed in greater detail in FIG. 5 below, the capacity allocation system 285 may perform a variety of computer simulations and modeling to maximize the assignment of the allocation portion 270. In some embodiments and based upon the simulations and modeling, the capacity allocation system 285 may be able to assign the one or more of the plurality of client sites 205 their desired fractions. In other embodiments, the capacity allocation system 285 may be unable to assign each of the one or more of the plurality of client sites 205 their desired fractions, but may be able to assign an alternative fraction.

Further, the capacity of the allocation portion 270 is designed to change dynamically. For example, as the number of clusters that operate from the plurality of client sites 205 pre-disaster (e.g., the clusters 225D-225Z, 235D-235Z, and 245D-245Z) and that fail ("referred to herein as "number of failures") increases (e.g., due to increasing number of disaster conditions or one or more disaster conditions causing a domino effect to cause additional failures at the client sites), the capacity allocation system 285 may take some capacity away from the allocation portion 270 and add that capacity to the reserve portion 265. Thus, as the number of failures increase, the capacity of the reserve portion 265 increases and the capacity of the allocation portion 270 decreases. Likewise, when the number of failures decreases, the capacity of the allocation portion 270 increases and the capacity of the reserve portion 265 decreases. By dynamically varying the capacities of the reserve portion 265 and the allocation portion 270, the site operator 215 may make an efficient use of the resources of the disaster recovery site 210, such that the disaster recovery site is available for disaster recovery purposes in the aftermath of a disaster condition, and used for regular operations when the disaster recovery site is not needed for disaster recovery purposes.

When the capacity of the allocation portion 270 is decreased to accommodate increasing numbers of disasters, impacted clusters (e.g., clusters using that capacity of the allocation portion that is moved into the reserve portion 265) are migrated back to their respective client sites. If those client sites are impacted by the disasters, then those clusters are migrated to the reserve portion 265, either directly from the allocation portion 270 (e.g., without migrating back to the client site first) or migrated to the client site and from the client site to the reserve portion. When the disaster condition is resolved, the capacity allocation system 285 may migrate those clusters back to the allocation portion 270.

To dynamically vary the capacities of the reserve portion 265 and the allocation portion 270, the capacity allocation system 285 monitors the number of failures occurring or impending at the plurality of client sites 205 at operation 325. If the total number of failures at the plurality of client sites 205 combined is equal to or below a pre-determined threshold, the capacity allocation system 285 continues to monitor the number of failures at the operation 325. If the number of failures exceeds the pre-determined threshold, the capacity allocation system 285 dynamically adjusts the capacity of the reserve portion 265 and the allocation portion 270 at operation 330. The dynamic adjustment of the reserve portion 265 and the allocation portion 270 is discussed in greater detail below in FIG. 6.

Thus, the capacity allocation system 285 continues to monitor the failures at the plurality of client sites 205 and dynamically varies the reserve portion 265 and the allocation portion 270 based upon those failures. The process 300 ends at operation 335 with the capacity allocation system 285 continuing to monitor for failures and varying the capacity of the reserve portion 265 and the allocation portion 270 dynamically.

Figure 4:
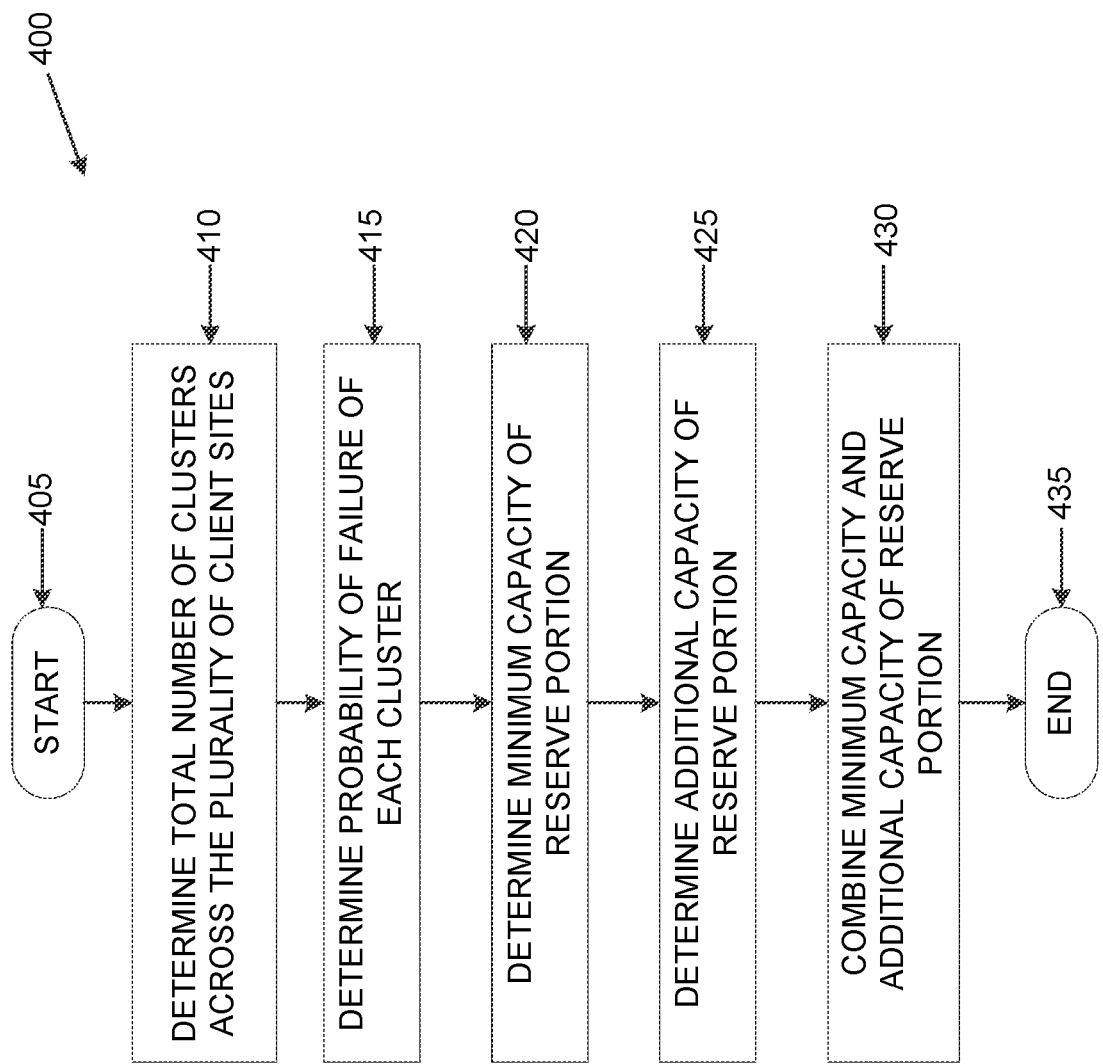
FIG. 4 is an example flowchart outlining operations for determining a capacity of an allocation portion in the hybrid system, in accordance with some embodiments of the present disclosure.

Referring to FIG. 4, a flowchart outlining a process 400 for determining a capacity of the reserve portion 265 in the disaster recovery site 210 is shown, in accordance with some embodiments of the present disclosure. The process 400 may include additional, fewer, or different operations, depending on the particular embodiment. The process 400 is discussed in conjunction with FIG. 2 and is implemented by the capacity allocation system 285 of the site operator 215. As discussed above, the reserve portion 265 is that portion of the disaster recovery site 210 that is reserved for disaster recovery purposes. The capacity allocation system 285 calculates the capacity of the reserve portion 265 based on the Law of Large Numbers. The Law of Large Numbers is a probability principle that posits that a frequency of occurrence of a large number of random events tends to concentrate in a narrow and highly predictable range. Thus, even though the probability of failure at each of the plurality of client sites 205 may be different and unrelated generally speaking, by combining the probabilities of failure of a large number of the plurality of client sites, the probability of failure of any given one of the plurality of client sites may be predicted with significant accuracy.

Based upon the predicted probability of failure of the plurality of client sites 205, the capacity allocation system 285 determines the capacity of the reserve portion 265. Thus, the process 400 starts at operation 405 and at operation 410, the capacity allocation system 285 determines the total number of clusters (represented herein by variable "n") across all of the plurality of client sites 205. The total number of clusters, n, includes the clusters that are migrating to the disaster recovery site 210 pre-disaster (e.g., the clusters 225A-225N, 235A-235N, 245A-245N) and the clusters that are migrating to the disaster recovery site post-disaster (e.g., the clusters 255D-225Z, 235D-235Z, and 245D-245Z). Thus, as shown in FIG. 2, the total number of clusters, n, of the plurality of client sites 205 includes the sum of the clusters 225A-225N, 235A-235N, 245A-245N, 255D-225Z, 235D-235Z, and 245D-245Z. Further, the capacity allocation system 285 may determine the capacity (e.g., number of user VMs) of each of the clusters in the total number of clusters, n. The capacity of each of the clusters in the total number of clusters is represented herein by variable "c."

At operation 415, the capacity allocation system 285 determines the probability of failure of each of the clusters (e.g., the clusters 225A-225N, 235A-235N, 245A-245N, 255D-225Z, 235D-235Z, and 245D-245Z). Generally speaking, based upon the configuration of each of the clusters, the probability of failure of each of those clusters for any given type of disaster condition may be different from the other clusters. However, as indicated above, based on the Law of Large Numbers, the different probabilities of failure of each of the clusters may concentrate to a small range. Thus, for simplicity, the capacity allocation system 285 may assume that the probability of failure (designated herein by variable "p") for each of the clusters in any given time period is the same. For example, the capacity allocation system 285 may assume that the likelihood that a particular cluster fails within the next three months is 1%. It is to be understood that any examples used in the present disclosure are simply for instruction purposes and are not intended to be construed as limiting in any way.

Further, to calculate the initial capacity of the reserve portion 265, the capacity allocation system 285 assumes that the failure of clusters (e.g., the clusters 225A-225N, 235A-235N, 245A-245N, 255D-225Z, 235D-235Z, and 245D-245Z) is independent and unrelated to one another. As discussed below, the failures of the clusters need not always be independent and unrelated. Rather, the failure may be correlated, such that a failure in one cluster may trigger a failure in another cluster, and so on. Such failures are referred to herein as correlated failures. Thus, failures in the clusters may either be independent failures or correlated failures. The capacity allocation system 285 determines the initial capacity of the reserve portion 265 with the assumption that the failures in the clusters are independent failures. As the failures become correlated failures, the capacity allocation system 285 dynamically varies the capacity of the reserve portion 265.

Additionally, the capacity allocation system 285 determines the probability of failure for each of the clusters (e.g., the clusters 225A-225N, 235A-235N, 245A-245N, 255D-225Z, 235D-235Z, and 245D-245Z) based upon individual failure probabilities of hardware components making up a particular cluster, as well as past history of failure of those components. For example, as indicated above, each cluster is composed of a variety of hardware components, such as memory devices, processing units, cables and wires, routers, modems, etc. Manufactures of these hardware components often provide a probability of failure of their components. Thus, for each (or at least most) hardware components that make up any given cluster, a probability of failure of those components is known. Further, certain components may be more prone to failures than others. Thus, past failure history of a particular component may be factored into the probability of failure of an individual component. Thus, combining the probability of failure of a component provided by the manufacturer of that component and the past history of failure of that component, an overall probability of failure of a particular component may be determined.

The overall probability of failure of individual hardware components making up a cluster may be combined (e.g., averaged, etc.) to determine the probability of failure of a particular cluster. The capacity allocation system 285 then combines those individual probabilities of failure of each of the clusters using the Law of Large Numbers to determine the probability of failure, p, of each of the clusters. Further, the capacity allocation system 285 may group all of the clusters, n, into one or more groups. Size of a group (e.g., number of clusters in a group) is represented by variable "g" herein. Initially, when the capacity allocation system 285 assumes that the failures are independent, the capacity allocation system designates group size, g=1 such that each group has an single cluster, or in other words, each individual cluster is its own group. As the independent failures transition into correlated failures, as discussed below, the capacity allocation system 285 may increase the group size. Further, as the correlated failures decrease, the capacity allocation system 285 may decrease the group size. Thus, the group size, g, may vary from 1 (where each cluster is its own group for a total of n groups for n clusters) to n (where all of the clusters are part of one group).

As discussed herein, the capacity allocation system 285 receives the various parameters (e.g., the probability of failure of a component provided by the manufacturer and the past failure history) for calculating the probability of failure, p, from the plurality of client sites 205, the manufacturers of the components, a third party, or a combination thereof. In other embodiments, each of the plurality of client sites 205 may provide the individual probabilities of failure of each of their respective clusters to the capacity allocation system 285, and the capacity allocation system may simply combine those individual probabilities to obtain the probability of failure, p.

At operation 420, the capacity allocation system 285 calculates the minimum capacity of the reserve portion 265 that is needed at the disaster recovery site 210. By knowing the total number of clusters, n, the capacity of each of the clusters, c, and the probability of failure of each of the clusters, p, the capacity allocation system 285 computes the minimum capacity of the reserve portion 265 needed to accommodate all of the clusters, c, in the event of a disaster condition using the following formula:

$$\text{Minimum Capacity of Reserve Portion} = n*p*c$$

The above computed capacity of the reserve portion 265 is the minimum capacity of the disaster recovery site 210 that is reserved at all times for disaster recovery purposes. Even upon dynamically varying the capacities of the reserve portion 265 and the allocation portion 270, the above minimum capacity is reserved. In other words, the capacity of the reserve portion 265 may vary dynamically, but is at least equal to the minimum capacity above.

In some embodiments, the capacity allocation system 285 may allocate an additional capacity (represented herein by the variable "R") in the reserve portion 265 above the minimum capacity computed above. The additional capacity, R, may account for any unexpected disaster conditions that may occur. The capacity allocation system 285 determines the additional capacity, R, of the reserve portion 265 by computing an additional probability of failure (represented herein by the variable "Pr") that is less than the probability of failure, p, but greater than a pre-determined threshold. For example, the capacity allocation system 285 may determine the probability of failure, p, to be 1% as determined at the operation 415. The capacity allocation system 285 may also determine that the probability of certain types of disaster conditions happening is less than 0.1%. Thus, the capacity allocation system 285 may decide that since the likelihood of those disasters happening is so low (e.g., 0.1%), additional capacity, R, in the reserve portion 265 need not be reserved for such disasters, and that if those disasters actually occur, the allocation portion 270 may be dynamically reduced to make room in the reserve portion 265 to accommodate those disasters.

Thus, the capacity allocation system 285 determines the additional probability of failure, Pr, that is greater than the pre-determined threshold, but less than the probability of failure, p. Based upon the additional probability of failure, Pr, the capacity allocation system 285 may assign additional capacity in the reserve allocation to account for disasters that have a somewhat lower probability of failure (e.g., lower than the probability of failure, p), but greater than the pre-determined threshold. To compute the additional probability of failure, Pr, the capacity allocation system 285 may apply the principle of Chernoff-Hoeffding bounds using the following formulae:

$$Pr(gF \geq np+(R/C))=Pr(F \geq (n/g)p+(R/C)/g)$$

$$Pr(gF \geq np+(R/C))=Pr(F \geq (n/g)p+(R/C)/g) \leq \exp(-(R/C)^2/(3gnp))$$

In the formula above, F is the number of groups which may fail over a period of time. Each group may be assigned a random variable. In some embodiments, the random variable may take on a value of one if a particular group fails and a value of zero if that particular group does not fail. Then, the value of the number of groups that fail over time, F, is computed as a sum of the random variables for each of the groups. In other embodiments, the value of F may additionally or alternatively be determined from computer simulations and modeling, as well as past history of failure data. Chernoff-Hoeffding estimates provide bounds on the probability of a sum of the independent random variables of the various groups that exceed a pre-determined threshold. Thus, Chernoff-Hoeffding bounds the probability that F exceeds a threshold, which gives the inequality $Pr(F \geq (n/g) p+(R/C)/g) \leq \exp(-(R/C)2/(3gnp))$ above. This inequality indicates that the probability of having a large number of failures of the groups falls off exponentially.

Upon determining the additional probability of failure, Pr, the additional capacity, R, of the reserve portion 265 maybe computed using the following formula:

$$R/C = (\sqrt{g}) \sqrt{3np * \ln\left(\frac{1}{Pr}\right)}$$

Thus, from the above formula, the capacity allocation system 285 computes the additional capacity, R. At operation 430, the capacity allocation system 285 computes the total capacity of the reserve portion 265. Specifically, the capacity allocation system 285 computes the total capacity of the reserve portion 265 by combining the minimum capacity computed at the operation 420 and the additional capacity, R, computed at the operation 425:

Total capacity of the reserve portion=$(n*p*c)+R$

Upon computing the total capacity of the reserve portion 265, the remaining capacity of the disaster recovery site 210 may be allocated for the allocation portion 270, as discussed above with respect to the operation 315. The process 400 ends at operation 435 with the capacity allocation system 285 computing the capacity of the allocation portion 270.

Figure 5:
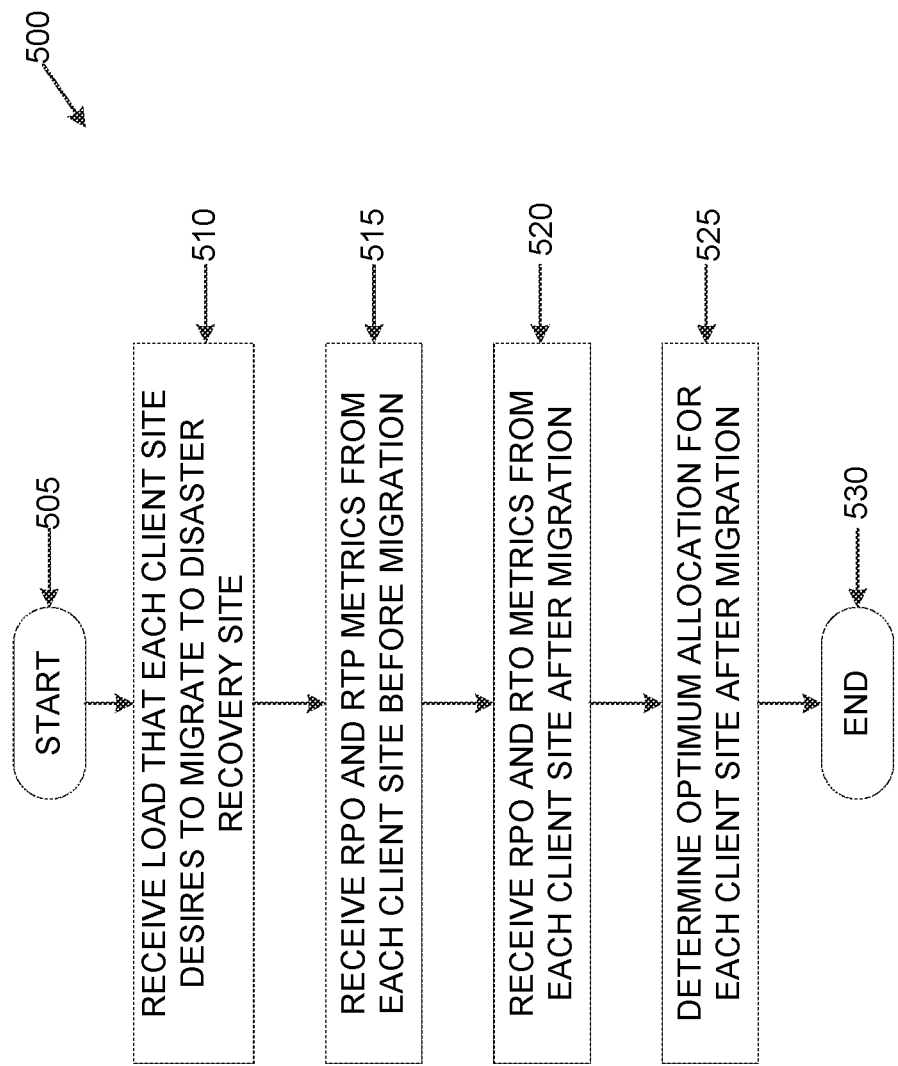
FIG. 5 is an example flowchart outlining operations for allocating the capacity of the allocation portion to one or more client sites, in accordance with some embodiments of the present disclosure.

Turning now to FIG. 5, an example flowchart outlining operations of a process 500 for allocating capacity from the allocation portion 270 is shown, in accordance with some embodiments of the present disclosure. The process 500 may include additional, fewer, or different operations, depending on the particular embodiment. The process 500 is discussed in conjunction with FIG. 2 and is implemented by the capacity allocation system 285 of the site operator 215. As discussed above, the allocation portion 270 is that portion of the disaster recovery site 210 that is allocated to the plurality of client sites 205 for running a portion of their respective clusters from the disaster recovery site pre-disaster instead of from the client sites.

Upon starting at operation 505, to divide the allocation portion 270 into one or more sections and distribute those sections amongst the plurality of client sites 205, the capacity allocation system 285 receives, at operation 510, a fraction of the clusters from the plurality of client sites 205 that they wish to migrate to the disaster recovery site 210. Each of the plurality of client sites 205 may wish to migrate a different fraction of their clusters to the disaster recovery site 210. Further, some of the plurality of client sites 205 may not wish to migrate any fraction of their clusters to the disaster recovery site. The fraction that each of the plurality of client sites 205 desires to migrate is designated herein by variable "f(c)" where "c" is representative of a particular client. Thus, the following constrain holds:

$\Sigma_c f(c)*L(c) \leq Cap_{DR}$

In the formula above, L(c) is the total number of clusters of a particular client site and $Cap_{DR}$ is the capacity of the allocation portion 270. Thus, the above formula indicates that the total fraction of clusters from all of the plurality of client sites 205 to be migrated to the disaster recovery site 210 cannot be greater than the capacity of the allocation portion.

At operations 515 and 520, the capacity allocation system 285 receives the RPO and RTO metrics from those ones of the plurality of client sites 205 that are interested in migrating their fractions of the clusters to the disaster recovery site 210 pre-disaster. Specifically, at the operation 515, the capacity allocation system 285 receives the RTO and RPO metrics of those ones of the plurality of client sites 205 before the migration, and at the operation 520, the capacity allocation system receives or computes the RPO and RTO metrics that the plurality of clients intend to achieve after migration. It is to be noted that the RPO and RTO values of each of the plurality of client sites 205 may vary from one another. As indicated above, RPO and RTO are performance metrics that the site operator 215 negotiates with the plurality of client sites 205. The following variables are used herein with respect to RPO and RTO of a particular client site, c:

RPO(c): RPO of client site, c, before migrating any clusters pre-disaster

RPO(f(c), c): RPO of client, c, after migrating the fraction to the disaster recovery site pre-disaster RTO(c): RTO of client site, c, before migrating any clusters pre-disaster RTO(f(c), c): RTO of client, c, after migrating the fraction to the disaster recovery site pre-disaster As discussed above, smaller values of RPO and RTO are desired. RPO(f(c), c) is less than RPO(c) and RTO(f(c), c) is less than RTO(c).

RPO(f(c), c) and RTO(f(c), c) may be computed by the capacity allocation system 285 as follows:

$$RPO(f(c),c) = f(c)*RPO(c)$$

$$RTO(f(c),c) = f(c)*RTO(c)$$

Based upon the fraction values received at the operation 510, the RPO and RTO values received at the operations 515 and 520, at operation 525, the capacity allocation system 285 determines an optimum distribution from the allocation portion 270. Specifically, the capacity allocation system 285 may determine savings (e.g., in terms of RPO and RTO) to each of the plurality of client sites 205 desiring to migrate their fractions to the disaster recovery site. For example, the capacity allocation system 285 may determine that for each client site, a gain that would accrue from migrating their fraction of clusters is as follows:

$$U(c) = u((1-f(c))*RPO(c),(1-f(c))*RTO(c),c]$$

Thus, the total gain amongst all of the plurality of client sites 205 that would accrue is:

$$\sum_c U(c)$$

The capacity allocation system 285, via computer simulations and modeling, maximizes the gain above, such that each of the plurality of client sites 205 is allocated at least a portion of their desired fractions. In some embodiments, based upon the simulations and modeling, the capacity allocation system 285 may determine that certain clients may be allocated a different portion than desired or alternatively some client sites are not allocated any portion of the allocation portion 270.

In some embodiments, the site operator 215 may also compute the allocations of the allocation portion 270 to maximize profit. For example, the site operator 215 may charge a fee for each second (or other unit of time) reduced from the RPO and RTO metrics. Based upon the fees that the plurality of client sites 205 are willing to pay, the capacity allocation system 285 may be configured to distribute the allocation portion 270 to maximize profit for the site operator. The site operator 215 may also implement a surge pricing or other pricing model to maximize the revenue. In other embodiments, different, additional, or other parameters may be used in distributing the allocation portion 270. The process 500 ends at operation 530.

Figure 6:
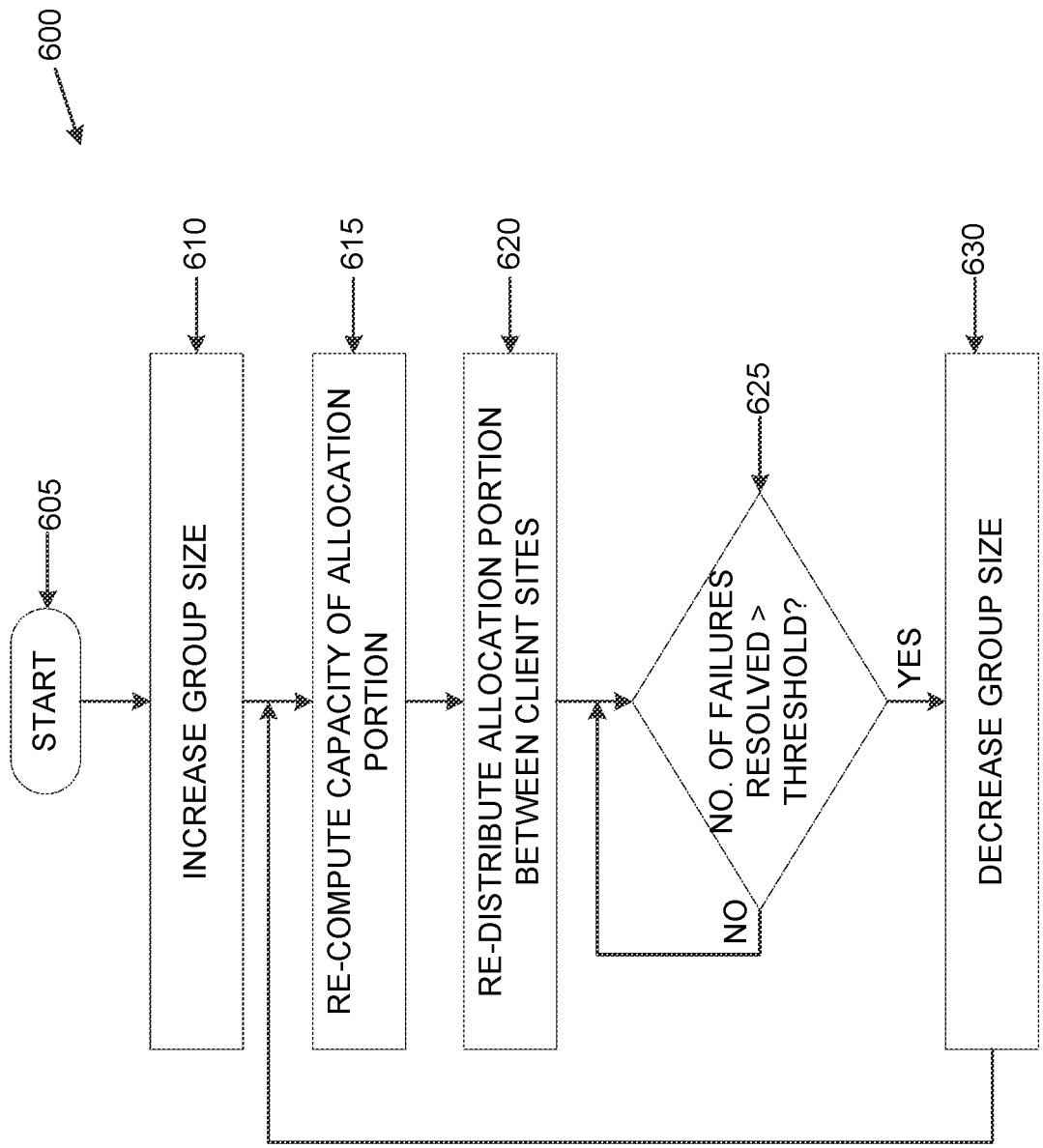
FIG. 6 is an example flowchart outlining operations for adjusting the capacity of the allocation portion, in accordance with some embodiments of the present disclosure.

Turning now to FIG. 6, an example flowchart outlining operations of a process 600 for dynamically varying the reserve portion 265 and the allocation portion 270 is shown, in accordance with some embodiments of the present disclosure. The process 600 may include additional, fewer, or different operations, depending on the particular embodiment. The process 600 is discussed in conjunction with FIG. 2 and is implemented by the capacity allocation system 285 of the site operator 215. As discussed above, the reserve portion 265 and the allocation portion 270 are dynamic and change based upon the number of failures occurring within the plurality of client sites 205. As also discussed above, initially, the capacity of the reserve portion 265 and the allocation portion 270 is determined with the assumption that the failures occurring at the plurality of client sites 205 are independent from one another and the grouping of the clusters is such that group size, g=1. However, as the number of independent failures increase or the failures translate into correlated failures (effectively increasing the number of failures), and the total number of failures (whether independent or correlated) exceed a pre-determined threshold, the capacity allocation system 285 starts varying the capacity of the reserve portion 265 and the allocation portion 270 dynamically.

Thus, upon starting at operation 605, to dynamically adjust the capacity of the reserve portion 265 and the allocation portion 270, at operation 610, the capacity allocation system 285 increases the group size, g, such that multiple clusters are grouped together into a single group. In some embodiments, clusters may be grouped together based on the infrastructure shared by those clusters. For example, in some embodiments, clusters that share a common back-end router or clusters that share the same power circuit may be grouped together into a single small group. In some embodiments, larger groups may be formed on the basis of larger infrastructure that is shared. For example, larger groups may include clusters that share the same Heat, Ventilation, and Air Conditioning ("HVAC") unit or the same Internet connectivity. Even larger groups may include clusters in the same data center or clusters in the same geography. Thus, in some embodiments, infrastructure may be used to group clusters. In other embodiments, other or additional parameters may be used to group clusters together. For example, clusters from a single client site or client sites separated by a certain distance may be grouped into groups. Other parameters may be considered as well.

Furthermore, the capacity allocation system 285 increases the group size, g, based upon an increase in the total number of failures. In some embodiments, when the total number of failures exceed six sigma or six standard deviations, (e.g., F>np+6√(np(1-p))), then the capacity allocation system 285 increases the group size, g, to a next higher level. In some embodiments, the next higher level may include grouping between, and including, four and sixteen clusters in a single group. In other embodiments, the number of clusters in a single group may vary. If the total number of failures again exceeds six sigma, the capacity allocation system 285 may again increase the group size, g, such that between, and including, sixteen and sixty four clusters are grouped together into a single group. In other embodiments, the capacity allocation system 285 may utilize the three-sigma rule or any other desired mechanism to determine when to increase the group size, g. Furthermore, at each level of increase in the group size, g, the capacity allocation system 285 may determine based upon the information available at the time (e.g., infrastructure related information, failure information, etc.) to determine the number of clusters to put together into a single group.

Upon increasing the group size, g, in some embodiments, the capacity allocation system 285 may re-compute the probability of failure, p, of the group. In other embodiments, since the probability of failure, p, is computed based upon the Law of Large Numbers, the probability of failure, p, of the group, g>1, is likely to be similar to the probability of failure, p, when g=1. Thus, the capacity allocation system 285 may assume that the probability of failure of the group, g>1 is also "p."

At operation 615, the capacity allocation system 285 re-computes the reserve portion 265 using the process 400 of FIG. 4 above, but with the increased group size, g. Specifically, the capacity allocation system 285 computes the minimum capacity and the additional capacity of the reserve portion 265 using the group size, g, determined at the operation 610. At operation 620, the capacity allocation system 285 re-computes the distribution of the allocation portion 270 using the process 500 of FIG. 5 above. When the group size, g, is increased, the capacity of the reserve portion 265 is increased and the capacity of the allocation portion 270 is decreased. When the capacity of the allocation portion 270 is decreased, certain clusters of one or more of the plurality of client sites 205 that had previously migrated to the allocation portion may need to be kicked out of the allocation portion, at least temporarily until at least some of the failures are resolved. In such cases, the re-computation of the distribution of the allocation portion 270 from the process 500 facilitates the decision which cluster/client site may need to be kicked out.

In some embodiments, one or more of the plurality of client sites 205 that otherwise may have been kicked out may be amongst those client sites impacted by the failures. In such cases, the capacity allocation system 285 may simply migrate those clusters from the allocation portion 270 to the reserve portion 265. The capacity allocation system 285 continues to monitor the failures at the plurality of client sites 205, and as the number of failures increase, dynamically increase the group size, g, and re-compute the reserve portion 265 and the allocation portion 270. The capacity allocation system 285 also monitors the plurality of client sites 205 for failures that are resolved. Thus, at operation 625, the capacity allocation system 285 determines whether the number of resolved failures exceeds a pre-determined threshold. If the number of failures is less than the pre-determined threshold, the process 600 remains at the operation 625. If the number of failures resolved exceeds the pre-determined threshold at the operation 625 (or in other words, the number of failures is decreasing), the capacity allocation system 285 decreases the group size, g, at operation 630, and re-computes the reserve portion 265 in accordance with the process 400 at the operation 615 and re-distributes the allocation portion 270 in accordance with the process 500 at the operation 620.

Thus, the capacity allocation system 285 continues to monitor the failures and dynamically increase the reserve portion 265 (and reduce the allocation portion 270) as the number of failures increase, and dynamically decrease the reserve portion (and increase the allocation portion) as the number of failures decrease. By virtue of dynamically allocating capacity from the disaster recovery site, the present disclosure provides a mechanism for making effective use of the highly reliable disaster recovery site, while ensuring that the disaster recovery site is available for disaster recovery when needed.

It is to be understood that although the present disclosure has been discussed with respect to creating a hybrid system using the disaster recovery site, the present disclosure may also be applicable in other scenarios. For example, the plurality of client sites 205 may create a hybrid cloud amongst each other, such that one or more client sites may migrate a portion of their clusters to other client sites or other third party virtual computing systems for normal operation pre-di s aster.

It is also to be understood that in some implementations, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method comprising:
    determining, by a processor of a capacity allocation system, a total number of clusters across a first computing site and a probability of failure of each of the clusters;
    computing, by the processor, a storage capacity of a reserve portion of a second computing site based upon the total number of the clusters and the probability of failure of each of the clusters, wherein the reserve portion is part of a total storage capacity of the second computing site and reserved for migrating a first subset of the clusters from the first computing site to the second computing site post-disaster;
    determining, by the processor, the storage capacity of an allocation portion of the second computing site based upon the total storage capacity and the storage capacity of the reserve portion; and
    migrating, by the processor, a second subset of the clusters from the first computing site to the allocation portion for operating the second subset of the clusters from the second computing site pre-disaster.

2. The method of claim 1, wherein the probability of failure associated with each of the clusters is based upon a past failure history of a component of each of the clusters.

3. The method of claim 1, wherein the probability of failure associated with each of the clusters is based upon a combination of a probability of failing of each individual component of a group of components of each of the clusters.

4. The method of claim 1, wherein the probability of failure of each of the clusters is based upon a Law of Large Numbers.

5. The method of claim 1, wherein the storage capacity of the reserve portion is a combination of a minimum storage capacity and an additional storage capacity, and wherein the minimum storage capacity and the additional storage capacity are each part of the total storage capacity of the second computing site.

6. The method of claim 5, wherein the additional storage capacity is based upon an additional probability of failure that is indicative of a likelihood of a particular disaster occurring, and wherein the additional probability of failure is greater than a pre-determined threshold.

7. The method of claim 5, wherein the minimum storage capacity is computed as a product of the total number of the clusters, the probability of failure of each of the clusters, and the storage capacity of each of the clusters on the first computing site.

8. The method of claim 1, wherein the processor groups the clusters into at least one group for computing the storage capacity of the reserve portion.

9. The method of claim 1, further comprising:
    dynamically increasing the storage capacity of the reserve portion and decreasing the storage capacity of the allocation portion based upon a number of failures at the first computing site exceeding a first pre-determined threshold; and
    dynamically decreasing the storage capacity of the reserve portion and increasing the storage capacity of the allocation portion based upon the number of failures that are resolved exceeding a second pre-determined threshold.

10. A system comprising:
    a processing unit comprising computer-readable instructions that when executed cause the processing unit to:
        determine a total number of clusters across a first computing site and a probability of failure of each of the clusters;
        compute a storage capacity of a reserve portion of a second computing site based upon the total number of the clusters and the probability of failure of each of the clusters, wherein the reserve portion is part of a total storage capacity of the second computing site and reserved for migrating a first subset of the clusters from the first computing site to the second computing site post-disaster;
        determine the storage capacity of an allocation portion of the second computing site based upon the total storage capacity and the storage capacity of the reserve portion; and
        migrate a second subset of the clusters from the first computing site to the allocation portion for operating the second subset of the clusters from the second computing site pre-disaster.

11. The system of claim 10, wherein the storage capacity of the reserve portion is a combination of a minimum storage capacity and an additional storage capacity, and wherein the minimum storage capacity and the additional storage capacity are each part of the total storage capacity of the second computing site.

12. The system of claim 11, wherein the minimum storage capacity is computed as a product of the total number of the clusters, the probability of failure of each of the clusters, and the storage capacity of each of the clusters on the first computing site.

13. The system of claim 10, wherein the second computing site is a disaster recovery site, and wherein the first computing site is a client site associated with the disaster recovery site.

14. The system of claim 10, wherein the processing unit dynamically adjusts the storage capacity of the reserve portion and the storage capacity of the allocation portion based upon a number of failures at the first computing site.

15. The system of claim 10, wherein the processing unit determines a number of the second subset of the clusters based upon a recovery time objective metric and a recovery point objective metric of the first computing site, and the storage capacity of the allocation portion.

16. A non-transitory computer readable medium comprising computer-executable instructions embodied thereon that when executed by a processor cause the processor to perform a process comprising:
  determining a total number of clusters across a first computing site and a probability of failure of each of the clusters;
  computing a storage capacity of a reserve portion of a second computing site based upon the total number of the clusters and the probability of failure of each of the clusters, wherein the reserve portion is part of a total storage capacity of the second computing site and reserved for migrating a first subset of the clusters from the first computing site to the second computing site post-disaster;
  determining the storage capacity of an allocation portion of the second computing site based upon the total storage capacity and the storage capacity of the reserve portion; and
  migrating a second subset of the clusters from the first computing site to the allocation portion for operating the second subset of the clusters from the second computing site pre-disaster.

17. The non-transitory computer readable media of claim 16, wherein the storage capacity of the reserve portion is a combination of a minimum storage capacity and an additional storage capacity, and wherein the minimum storage capacity and the additional storage capacity are each part of the total storage capacity of the second computing site.

18. The non-transitory computer readable media of claim 16, wherein the processor dynamically modifies the storage capacity of the reserve portion and the storage capacity of the allocation portion based upon a number of failures at the first computing site.

19. The non-transitory computer readable media of claim 18, wherein as the storage capacity of the reserve portion increases, the storage capacity of the allocation portion decreases.

20. The non-transitory computer readable media of claim 16, further comprising subtracting the storage capacity of the reserve portion from the total capacity of the second computing site for determining the storage capacity of the allocation portion.

* * * * *